A. E. MOOD.
RADIATOR PROTECTOR.
APPLICATION FILED MAR. 26, 1921.
1,428,179.
Patented Sept. 5, 1922.
2 SHEETS—SHEET 1.
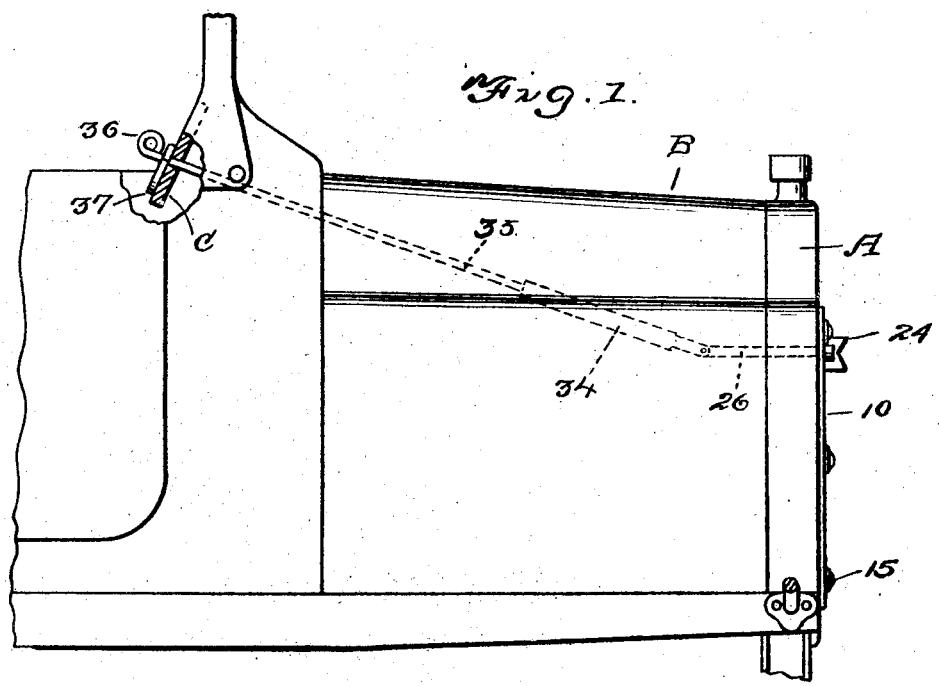
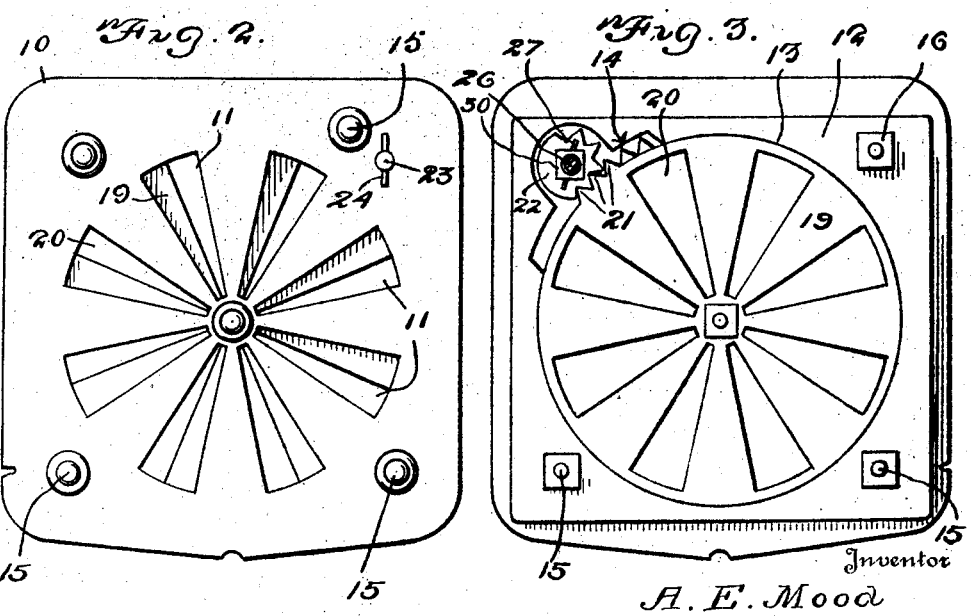
Inventor
A. E. Mood
By A. A. Gourick
Attorney

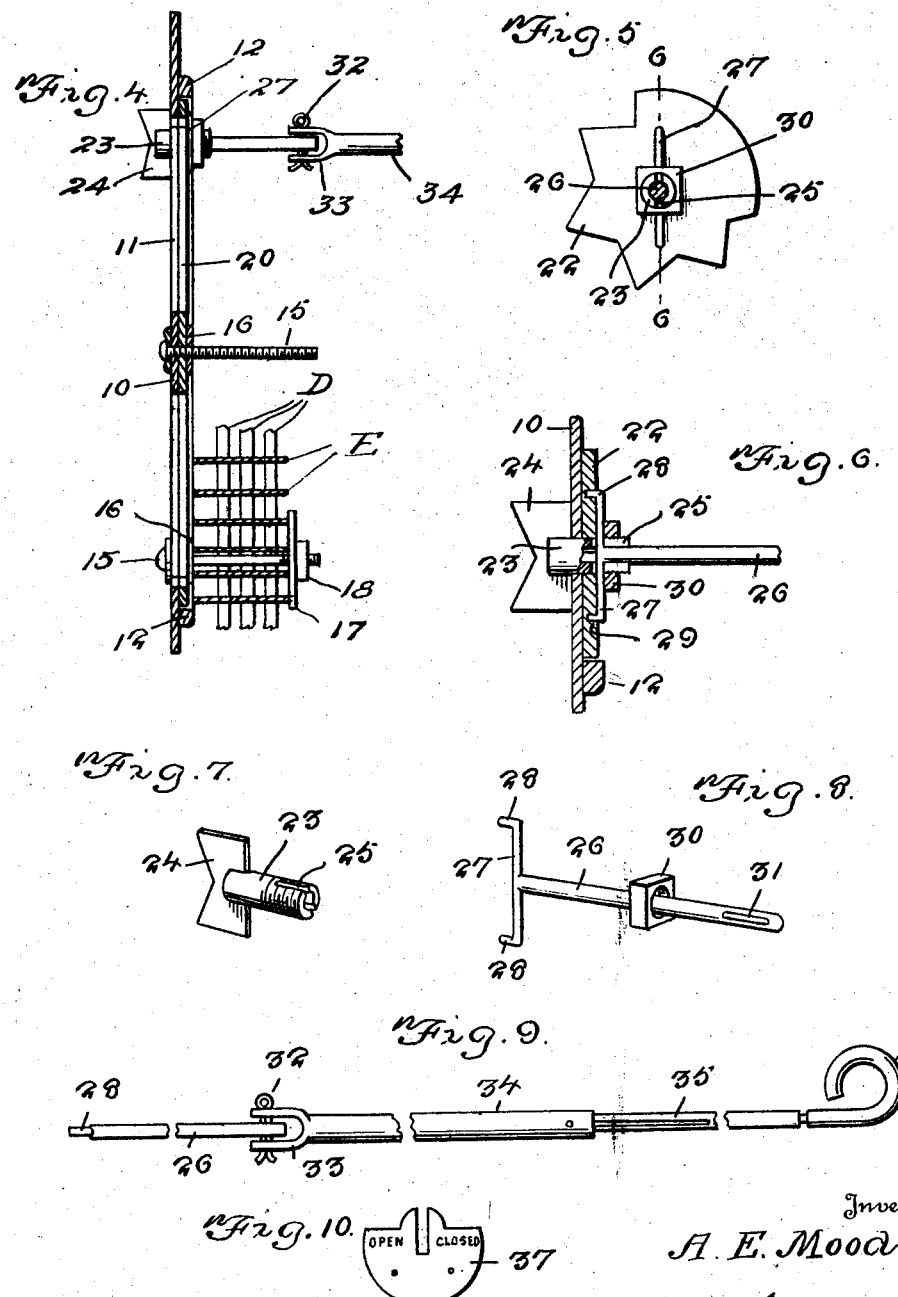

Patented Sept. 5, 1922.

1,428,179

UNITED STATES PATENT OFFICE.

ARTHUR E. MOOD, OF WICHITA, KANSAS.

RADIATOR PROTECTOR.

Application filed March 26, 1921. Serial No. 455,917.

*To all whom it may concern:*

Be it known that I, ARTHUR E. MOOD, a citizen of the United States, residing at Wichita, in the county of Sedgwick and State of Kansas, have invented new and useful Improvements in Radiator Protectors, of which the following is a specification.

This invention relates to radiator protectors and has for its object the provision of a novel device adapted to be secured upon the front of an automobile radiator whereby to protect the radiator from cold and consequently prevent freezing of the water and chilling of the motor.

An important object is the provision of a device of this character which is so constructed that it may be operated either from the dash of the automobile or from the front of the radiator.

Another object is the provision of a device of this character which includes a plate member secured upon the front of the radiator and formed with openings adapted to be closed by a rotatable disk likewise provided with openings which are capable of being brought into registration with the openings in the plate to permit cooling.

A further object is the provision of a novel gear mechanism for effecting rotation of the disk, peculiar means being provided for connecting one gear element with an operating rod extending through the dash of the automobile.

Still another object is the provision of special means for securing the device upon the radiator without necessitating any changes in the construction of the latter.

An additional object is the provision of a device of this character which will be simple and inexpensive in manufacture and installation, positive in action, efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of the front portion of an automobile showing my device applied.

Figure 2 is a front elevation of my protector detached.

Figure 3 is a rear elevation thereof.

Figure 4 is a vertical sectional view through my device and showing the means for securing it upon a radiator.

Figure 5 is a detail sectional view showing a rear elevation of the operating pinion.

Figure 6 is a cross sectional view on the line 6—6 of Figure 5 showing the pinion mounting.

Figure 7 is a detail perspective view of the pinion turning key.

Figure 8 is a detail perspective view of the pinion turning yoke member.

Figure 9 is a detail side elevation of the telescopic operating rod.

Figure 10 is a detail elevation of the guide plate secured upon the dash.

Referring more particularly to the drawings, the letter A designates the radiator of an automobile, B designates the hood, and C designates the dash. The structure of the radiator forms no part of the present invention but it is shown as including vertical tubes D passing through the usual fins E.

In carrying out my invention I provide a protector formed as a substantially rectangular plate 10 of suitable material disposed against the front of the radiator and formed with a circular series of segmental openings 11. Disposed against the rear side of this plate, that is between it and the radiator, is a frame 12 having a circular opening 13 leading into a cut-out portion 14.

It is conceivable that the device might be secured upon the radiator in many ways, though for sake of illustration I have shown bolts 15 which pass through the plate and frame and between successive fins E. Nuts 16 are threaded on these bolts and secure the frame to the plate. Plates 17 are disposed upon these bolts in engagement with the rear edges of the adjacent fins and are clamped in position by wing nuts 18 or the like.

Rotatable upon the central one of the bolts 15 is a disk 19 movable within the circular hole 13 in the frame 12 and this disk is formed with a series of segmental openings 20 adapted to be brought more or less into registration with the openings 11. This disk is formed in its periphery with gear teeth 21 located within the cut-out portion 14 of the frame.

In order to effect movement of the disk I provide a pinion 22 meshing with the teeth 21 and disposed upon the shank 23 of a keylike member journaled through the plate 10 and having a head 24. This shank 23 is longitudinally slotted, as shown at 25. The numeral 26 designates an operating rod carrying a cross member 27 engaged within the slot 25 and having laterally bent ends 28 fitting within holes 29 in the pinion 22. A nut 30 is threaded onto the shank 23 and holds the cross member 27 associated with the pinion. The free end of the rod 26 is slotted, as shown at 31, for the passage of a cotter pin or the like 32 extending across a yoke 33 on the end of a rod 34 which is tubular and within which is longitudinally adjustably mounted a rod 35 which extends through the dash C. The free end of the rod 35 is looped to form a handle 36 and has associated therewith a plate 37 secured upon the dash and provided at opposite sides with the legends "Open" and "Closed."

In the operation of the device it will be seen that ordinarily the disk 19 is in such position that the openings 20 therein will register with the openings 11 so that air may pass through for cooling the radiator. When the parts are in this position the handle 36 will point to the legend "Open." When the automobile is left standing in cold weather the operator may grasp the handle 36 and turn the rods 35, 34 and 26 to effect rotation of the pinion 22 and consequently the disk 19 to bring the openings 20 and 11 out of registration. Air cannot then pass to the radiator and freezing will be prevented. It will be noted that instead of turning the handle 36 the operator may move the disk 19 by turning the key member 24 at the front of the vehicle.

From the foregoing description and a study of the drawings it will be apparent that I have thus provided a simply constructed and very easily operated device for protecting an automobile radiator against freezing, the device being controllable from either the inside or the front of the vehicle as may be preferred. Owing to the simplicity it will be observed that the device will be inexpensive to make and install and that it should have long life as there is practically nothing to get out of order.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A radiator protector for automobiles comprising a plate member formed with a series of openings, a disk member journaled upon the back of said plate and provided with openings adapted to register with said first named openings, said disk having its periphery formed as a segmental gear, a pinion journaled upon said plate and meshing with said gear, a support for the pinion passing through the plate and formed at the front thereof with an operating head, the rear end of the support being slotted and threaded, a rod having a cross member engaged within said slot and having the ends of the cross member laterally bent and extending into holes in the pinion, a nut threaded upon the support and engaging said cross member, and a telescopic operating member flexibly connected with said rod and extending through the dash of the automobile.

2. A radiator protector for automobiles comprising a plate member secured upon the front of the radiator and formed with a series of openings, a disk journaled upon the back of said plate and formed with openings adapted to register with said first named openings, said disk having its periphery formed as a segmental gear, a pinion journaled upon the plate and meshing with said gear, a support for the pinion passing through the plate and formed at the front thereof with an operating head, a rod associated with said support and secured with respect thereto and carrying a cross member connected with the pinion, and means connected with said rod and extending to the dash of the vehicle for effecting rotation of the pinion.

In testimony whereof I hereto affix my signature.

ARTHUR E. MOOD.